(12) United States Patent
Thomas

(10) Patent No.: US 10,518,761 B2
(45) Date of Patent: Dec. 31, 2019

(54) ELECTRIC PARK BRAKE WITH ELECTROMAGNETIC BRAKE

(71) Applicant: AKEBONO BRAKE INDUSTRY CO., LTD, Chuo-ku, Tokyo (JP)

(72) Inventor: Carla Thomas, Royal Oak, MI (US)

(73) Assignee: AKEBONO BRAKE INDUSTRY CO., LTD, Chuo-ku, Tokyo (JP)

( * ) Notice: Subject to any disclaimer, the term of this patent is extended or adjusted under 35 U.S.C. 154(b) by 25 days.

(21) Appl. No.: 15/631,339

(22) Filed: Jun. 23, 2017

(65) Prior Publication Data

US 2018/0001878 A1    Jan. 4, 2018

Related U.S. Application Data

(60) Provisional application No. 62/357,406, filed on Jul. 1, 2016, provisional application No. 62/501,199, filed on May 4, 2017.

(51) Int. Cl.
| | |
|---|---|
| *B60T 13/74* | (2006.01) |
| *B60T 13/68* | (2006.01) |
| *F16D 121/24* | (2012.01) |
| *F16D 123/00* | (2012.01) |

(52) U.S. Cl.
CPC ............ *B60T 13/68* (2013.01); *B60T 13/746* (2013.01); *F16D 2121/24* (2013.01); *F16D 2123/00* (2013.01)

(58) Field of Classification Search
CPC ...... F16D 55/22; F16D 55/224; F16D 55/225; F16D 55/226; F16D 2121/22; F16D 2055/0004; F16D 2055/0016; B60T 13/74; B60T 13/746; B60T 13/748

USPC .......................... 188/156, 157, 158, 161, 171
See application file for complete search history.

(56) References Cited

U.S. PATENT DOCUMENTS

| | | | |
|---|---|---|---|
| 2,292,704 | A | 8/1942 | Lillquist |
| 2,949,172 | A | 8/1960 | Simons |
| 4,228,874 | A | 10/1980 | Brinkman et al. |
| 4,510,405 | A | 4/1985 | Carrol et al. |

(Continued)

FOREIGN PATENT DOCUMENTS

| | | |
|---|---|---|
| DE | 202008005372 U1 | 7/2008 |
| EP | 0905402 A2 | 3/1999 |

(Continued)

OTHER PUBLICATIONS

Spring-Set Brakes, Fail-Safe Electrically Actuated Friction Brakes. The Carlyle Johnson Machine Company, L.L.C. Accessed on Jun. 23, 2017 at < www.cjmco.com/downloads/specifications/single-disc-spring-set-brakes-sab.pdf>.

(Continued)

*Primary Examiner* — Thomas J Williams
(74) *Attorney, Agent, or Firm* — The Dobrusin Law Firm, P.C.

(57) ABSTRACT

A brake assembly comprising: (a) a caliper including: (i) one or more pistons, (b) one or more rotary to linear actuators that provides an axial force to move the one or more pistons, (c) a motor gear unit in communication with the one or more rotary to linear actuators, the motor gear unit including: (i) a motor, and (ii) an electromagnetic brake that prevents movement of the motor gear unit, the pistons, or both when the motor is turned off so that the brake apply is maintained.

20 Claims, 9 Drawing Sheets

(56) References Cited

U.S. PATENT DOCUMENTS

| | | | |
|---|---|---|---|
| 4,809,824 A | 3/1989 | Fargier et al. | |
| 5,185,542 A | 2/1993 | Lazorchak | |
| 5,348,123 A | 9/1994 | Takahashi et al. | |
| 5,685,398 A * | 11/1997 | Marshall | F16D 55/28 164/108 |
| 5,808,392 A | 9/1998 | Sakai et al. | |
| 5,982,063 A | 11/1999 | Lutz et al. | |
| 6,213,256 B1 * | 4/2001 | Schaffer | B60T 13/741 188/156 |
| 6,269,917 B1 | 8/2001 | Harting et al. | |
| 6,471,017 B1 * | 10/2002 | Booz | F16D 55/02 188/162 |
| 6,536,561 B1 | 3/2003 | Keller | |
| 7,942,247 B2 * | 5/2011 | Adachi | B60T 13/741 188/156 |
| 8,651,246 B2 * | 2/2014 | Chen | F16D 65/186 188/161 |
| 8,733,527 B2 | 5/2014 | Greeene | |
| 9,199,623 B2 * | 12/2015 | Hyun | B60T 8/885 |
| 9,586,678 B2 | 3/2017 | Drennen et al. | |
| 2002/0185342 A1 | 12/2002 | Bausch et al. | |
| 2004/0154880 A1 | 8/2004 | Guaraldo | |
| 2005/0082908 A1 * | 4/2005 | Klode | B60T 13/02 303/20 |
| 2006/0170184 A1 | 8/2006 | Lan et al. | |
| 2007/0187193 A1 * | 8/2007 | Tarhan | H02K 7/1025 188/171 |
| 2008/0136279 A1 | 6/2008 | Berndt et al. | |
| 2008/0283345 A1 * | 11/2008 | Balz | F16D 65/18 188/72.6 |
| 2012/0073916 A1 | 3/2012 | Chen | |
| 2014/0000992 A1 | 1/2014 | Tajima | |
| 2014/0188361 A1 | 7/2014 | Hyun et al. | |
| 2015/0355038 A1 | 12/2015 | Masuda | |

FOREIGN PATENT DOCUMENTS

| | | |
|---|---|---|
| JP | 2001-146932 A | 5/2001 |
| WO | 97/44595 A1 | 11/1997 |
| WO | 99/31792 A1 | 6/1999 |
| WO | 02/49891 A1 | 6/2002 |
| WO | 03/050437 A2 | 6/2003 |
| WO | 2005/031184 A1 | 4/2005 |
| WO | 2011/064713 A1 | 6/2011 |

OTHER PUBLICATIONS

Potentially Related U.S. Appl. No. 62/408,904, filed Oct. 17, 2016.
Potentially Related U.S. Appl. No. 62/374,236, filed Aug. 12, 2016.
Potentially Related U.S. Appl. No. 62/359,910, filed Jul. 8, 2016.
Extended European Search Report for Application No. 17178202 dated Nov. 28, 2017.

* cited by examiner

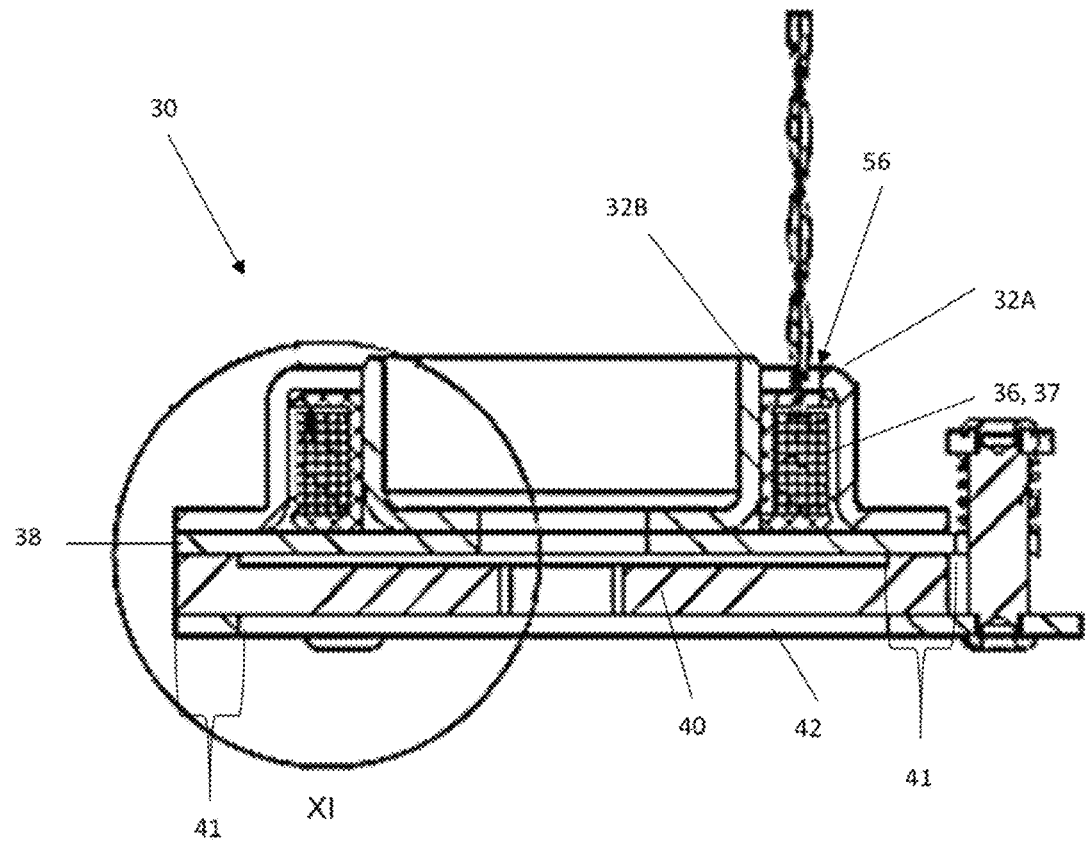
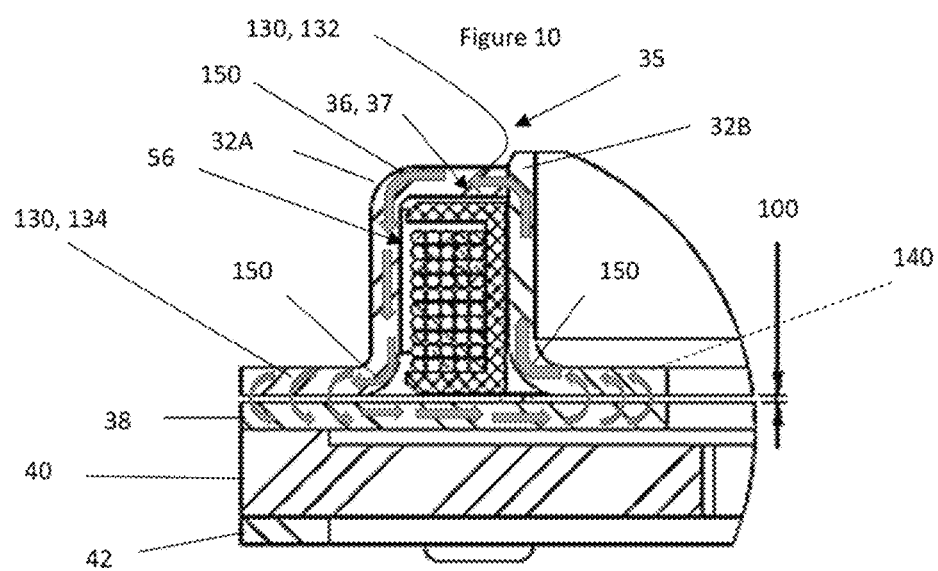
Figure 11

US 10,518,761 B2

ELECTRIC PARK BRAKE WITH ELECTROMAGNETIC BRAKE

FIELD

The present teachings generally relate to a high efficiency electric parking brake that includes an electromagnetic brake to prevent back drive when the parking brake is applied.

BACKGROUND

Vehicle brake systems typically have a service brake that has service brake apply modes and a parking brake system that has parking brake apply modes. During a service brake apply hydraulic pressure is applied to a piston that moves the piston. In recent systems, during a parking brake apply an electric motor and drive mechanism moves the piston to create the parking brake apply. Once the parking brake apply is complete the motor is turned off. Typically, worm gear or some other threaded member (e.g., lead screw) is located between the piston and the motor, which prevents the piston from back driving the mechanism and motor.

Examples of some may be found in U.S. Pat. Nos. 6,471,017; and 6,536,561 all of which are incorporated by reference herein for all purposes. It would be attractive to have a brake that prevents back drive of a motor when the motor is turned off. What is needed is a motor brake that prevents back drive of the drive mechanism when the brake pads are compressed by a drive mechanism such as a high efficiency rotary to linear actuator (e.g., ball screw or ball ramp). What is needed is an electromagnetic brake that when activated releases the mechanism and when deactivated defaults to a locked position.

SUMMARY

The present teachings meet one or more of the present needs by providing: brake assembly comprising: (a) a caliper including: (i) one or more pistons, (b) one or more rotary to linear actuators that provides an axial force to move the one or more pistons, (c) motor gear unit in communication with the one or more rotary to linear actuators, the motor gear unit including: (i) a motor, and (ii) an electromagnetic brake that prevents movement of the motor gear unit, the pistons, or both when the motor is turned off so that the brake apply is maintained.

The present teachings provide: a brake assembly comprising: (a) a caliper including: (i) one or more pistons, (b) one or more rotary to linear actuators that provides an axial force to move the one or more pistons, (c) a motor gear unit in communication with the one or more rotary to linear actuators, the motor gear unit including: (i) a motor, and (ii) an electromagnetic brake that prevents movement of the motor gear unit, the pistons, or both when the motor is turned off so that the brake apply is maintained, the electromagnetic brake including: (1) a core having an outer casing with an inner casing press fit into the outer casing.

The present teachings provide: a brake assembly comprising: (a) a caliper including: (i) one or more pistons, (b) one or more rotary to linear actuators that provides an axial force to move the one or more pistons, (c) a motor gear unit in communication with the one or more rotary to linear actuators, the motor gear unit including: (i) a motor, and (ii) an electromagnetic brake that prevents movement of the motor gear unit, the pistons, or both when the motor is turned off so that the brake apply is maintained, the electromagnetic brake including: (1) a rotor having a contact surface on a first side and a contact surface on a second side, the rotor having an outer radius, wherein the contact surfaces are located on the first side and the second side of the rotor, the contact surface on the first side and the contact surface on the second side having an outer diameter and an inner diameter forming a radial width extending between the outer diameter and the inner diameter, and the radial width being equal to about ¼ of the outer radius or less when measured from an outer diameter of the rotor.

The present teachings provide: a brake assembly comprising: (a) a caliper including: (i) one or more pistons, (b) one or more rotary to linear actuators that provides an axial force to move the one or more pistons, (c) a motor gear unit in communication with the one or more rotary to linear actuators, the motor gear unit including: (i) a motor, and (ii) an electromagnetic brake that prevents movement of the motor gear unit, the pistons, or both when the motor is turned off so that the brake apply is maintained, the electromagnetic brake including: (1) a core having a plurality of legs that extend outward from the core, wherein each of the plurality of legs are plastically deformable in a controlled manner.

The present teachings provide: a method comprising: (a) creating an electromagnetic brake by: (i) forming a core by press fitting an inner case into an outer case; (ii) placing an electrical coil into the core; (iii) placing a moving plate proximate to the electromagnet; (iv) placing a rotor adjacent to the moving plate; (b) connecting the electromagnetic brake to a motor by extending a shaft of a motor into the rotor; and (c) connecting the motor and electromagnetic brake to a caliper.

The present teachings provide a motor brake that prevents back drive of a motor when the motor is turned off. The present teachings provide a motor brake that prevents back drive of the drive mechanism when the brake pads are compressed by a drive mechanism such as a high efficiency rotary to linear actuator (e.g., ball screw or ball ramp). The present teachings provide an electromagnetic brake that when activated releases the mechanism and when deactivated defaults to a locked position.

BRIEF DESCRIPTION OF THE DRAWINGS

FIG. 10 is a cross-sectional view of the motor brake of FIG. 7 cut along line X-X;
FIG. 11 is a close-up view of an electrical coil and core of FIG. 10 within area XI.

DETAILED DESCRIPTION

Figure 1:
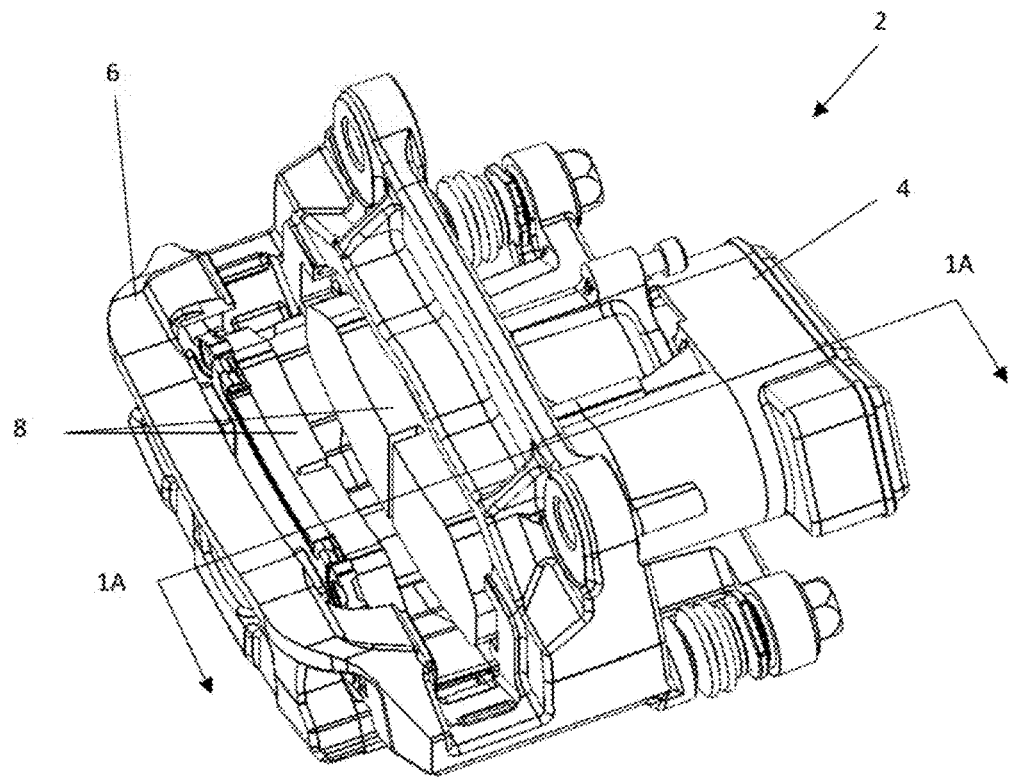
FIG. 1 is a perspective view of a brake assembly.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a brake assembly including a motor with an electromagnetic brake that maintains a parking brake apply. The brake assembly may be a floating caliper assembly, a fixed caliper assembly, a single piston assembly, a multi-piston assembly, a drum brake, or a combination thereof. Preferably, the brake assembly is a floating caliper or fixed caliper. The brake assembly may include a support bracket that connects a caliper to a machine (e.g., automobile, truck, wind turbine, paper machine). Preferably, the support bracket connects a caliper to a knuckle of a vehicle. The brake assembly may be free of a support bracket. The brake assembly be free of a caliper. The brake assembly may include one or more pistons, one or more piston bores, a plurality of pistons, a plurality of piston bores, or a combination thereof. The brake assembly may include hydraulic fluid that moves a piston axially into contact with a brake pad to create a brake apply when the hydraulic fluid is pressurized. The hydraulic pressure in the piston bore may be released when the brake apply is complete so that brake pads retract creating an air gap. The caliper may house the pistons, be connected to one or more motors, or a combination thereof that move brake pads or brake shoes to create a braking force.

The brake pads or brake shoes may function to contact a moving object and slow or stop the moving object. The brake pads or brake shoes function to create friction that stops or slows an object or maintains the object (such as a vehicle) at rest. The brake pads include friction material and a backing plate. The brake pads may be moved into contact with a rotor. The brake shoes may be moved into contact with a drum or a hat of a rotor. The brake pads or brake shoes may be moved axially by one or more pistons.

The one or more pistons function to axially move the one or more brake pads or brake shoes. The one or more piston may be hydraulically moved, mechanically moved, or both. The one or more pistons may be made of metal or a phenolic. The one or more pistons may move along a piston bore in a caliper to create a service brake apply, a parking brake apply, or both.

The one or more calipers may function to assist in creating a brake apply. The one or more calipers may support one or more pistons so that the pistons may be moved to create a brake apply, a parking brake apply, or both. The calipers may axially move in an opposite direction to the pistons. The calipers may be static. The caliper includes one or more piston bores that each house a piston. The piston bores may include a portion of a rotary to linear actuator. The caliper may be connected to one or more motor gear units, one or more motors, or both.

The one or more motor gear units may each move one or more pistons, two or more pistons, four or more pistons, or even six or more pistons. The one or more motor gear units function to mechanically move a piston to create a parking brake apply. The motor gear unit may function to move a high efficiency rotary to linear actuator (e.g., ball ramp, or ball screw) to create a brake apply. High efficiency as discussed herein is rolling friction (e.g. a ball or cylinder). High efficiency as discussed herein is not sliding friction. The high efficiency rotary to linear actuator may be a high efficiency spindle. The motor gear unit may be a combination of a motor and gears. The gears may reduce the rotation speed of the motor or increase torque to create a parking brake apply. The motor gear unit may include one or more motors. The motor gear units may include a gear reduction assembly, a planetary gear assembly, gears that increase torque or speed, gears that decrease torque or speed, or a combination thereof. The one or more gears may be connected to one or more motor shafts that output torque to a piston, a rotary to linear actuator, a high efficiency device such as a rotary to linear actuator, or a combination thereof. The motor gear unit is in communication with one or more motors. Preferably, the motor gear unit includes one or more motors.

The one or more motors may function to apply torque when power is applied to the motors. The one or more motors may function to rotate one or more gears, a rotary to linear actuator, a ball screw, a lead screw, a gear, a differential, or a combination thereof. The one or more motors may function to create a parking brake apply. The one or more motors may be an electric motor. The one or more motors may include one or more motor shafts.

The one or more motor shafts may function to receive a braking force, apply torque, rotate a rotary to linear actuator, apply torque to a differential assembly, or a combination thereof. The one or more motor shafts may be located at a distal end of the motor, a proximal end of the motor, or both. The motor shafts may extend out of the motor and communicate a force to one or more components of a brake assembly to create a braking force, a parking brake force, a service braking force, or a combination thereof. The motor shaft may extend into a motor brake (e.g., an electromagnetic brake). The motor shaft may extend into a rotor of a motor brake, into an engagement recess of a rotor of a motor brake, or both. The motor on one end may include a motor shaft that moves a piston and a second motor shaft that is in communication with a motor brake.

The motor brake functions to brake the motor when the motor is off so that a brake apply is maintained, the motor shaft does not rotate in a brake release direction, or both. The motor brake functions to be a brake on a motor. The motor brake functions to maintain a set position of a motor so that the motor prevents brake pads or brake shoes from moving and releasing or relaxing a braking force. Preferably the motor brake is an electromagnetic brake. The electromagnetic brake may be released when the motor is turned on so that the motor brake does not provide a braking function (e.g., when the motor is turned on the electromagnet may be powered so that the moving plate is moved forming an air gap between the rotor and the moving plate). The electromagnetic brake may be applied when the motor is turned off so that the electromagnetic brake prevents rotation of the motor shaft, gear system, or both. The electromagnetic brake may default to a brake on position when the power is off. The electromagnetic brake and the motor may be wired in parallel. For example, when power is applied to the motor, power may be substantially simultaneously applied to the motor brake so that the motor brake and the motor are activated substantially at the same time (i.e., within about 1 second or less or preferably within about 1 millisecond or less). The electromagnetic brake may be connected directly to the motor. The electromagnetic brake may be located within a housing, an enclosure of the motor gear unit, an enclosure of the motor, or a combination thereof. The motor brake may be fully or partially located within an enclosure of the motor gear unit, an enclosure of the motor, or both. The motor brake, the motor gear unit, the motor, or a combination thereof may be located within a same enclosure. The enclosure may seal the motor gear unit and the motor brake from environmental materials. The enclosure may hermetically seal the motor brake, the motor gear unit, the motor, the rotor, or a combination thereof. Preferably, the motor brake is at least partially located within a housing and the housing connects to the motor, the motor housing, or both.

The housing may function to protect the motor brake, the motor, or both. The housing may function to prevent environmental materials from entering into the motor brake (e.g., the housing may be hermetically sealed). The housing may be located within an enclosure. The housing may form part of an enclosure. The housing of the motor brake may connect with a housing of the motor forming an enclosure. The housing surrounds the motor brake and may connect the motor brake to the motor. The housing may surround the motor and the motor brake. The housing preferably surrounds the motor brake and connects the motor brake to the motor. The housing may be mechanically grounded to the motor and may ground the core (e.g., provide an anchor point for the core to prevent movement of the core. The housing may have a complementary shape to the motor brake. The housing may be circular, triangular, square, or a combination thereof. The housing may have an open end, a closed end, or both. The core may be mechanically grounded to the housing by being keyed to the housing. The core may be mechanically grounded to the housing by having a non-circular shape. For example, the core and the housing may be triangular and rotation of the core may be prevented by the core contacting the housing. The housing may have one or more raised surfaces on an inside of the housing that prevent movement of the core relative to the housing. The housing may be connected to the core by one or more fasteners. The housing prevents fluids from coming into contact with the motor brake. The housing may include one or more internal slides that fits within the recess of the moving plate so that the moving plate axially moves along the slides. The internal slides may be a material that extends radially inward from an inside of the housing. The internal slides may be keyed to the recess. The slides may perform the same function as legs, rivets, or both. The housing prevents fluids from coming into contact with the electromagnetic brake. The housing may surround the core, compression springs, electrical coil, moving plates, rotor, static plates, driver, wires, bobbin, electrical coils, inner case, outer case, or a combination thereof.

The electromagnetic brake may include one or more of each of the following items: wires, an electrical coil, a bobbin, a core, inner case, outer case, a rotor, compression springs, a moving plate, a static plate. The electromagnetic brake may include an electromagnet that includes a core and electrical coils. The one or more electrical coils may cooperate with the core to create a magnetic field. The one or more cores may be static. The core may be mechanically grounded (e.g., fixed) to the housing. Preferably, the one or more cores is made of a magnetic metal. The one or more cores may be made of steel, iron, or both. The one or more cores partially surround the electrical coils (e.g., include a coil recess that receives all or a portion of the electrical coils). The one or more cores may receive electrical coils. The core may be connected to the housing. The core may be mechanically grounded so that the core is free of movement or prevented from moving. The one or more cores may include one or more legs and one or more holes. The core may be a single piece that includes an outer piece and an inner piece that form a coil recess there between. The core may be a single piece. Preferably, the core may be made of multiple pieces. The cores may be made of an inner case and an outer case. A wall thickness of the core may be substantially uniform. For example, the inner case and the outer case may be formed from a material having the same thickness, thus, the wall thickness of the inner and outer cores may have an identical wall thickness. A wall thickness of the core may vary. The inner core may have a thicker wall than the outer core or vice versa. The core assists in directing an electromagnetic field. The core may prevent the electromagnetic field from extending in one direction and concentrate the electromagnetic field in a second direction. The core may include one or more coil recesses.

The coil recesses function to receive electrical coils, a bobbin, or both. The coil recesses may have one or more sides, preferably, two or more sides, and more preferably three or more sides of the electrical coils, the bobbins, or both. The coil recesses may be a generally "U" shaped channel when viewed in a cross section. The coil recess may include-a bottom wall, an inner diameter wall, an outer diameter wall, or a combination thereof. The coil recess may have an open top. The coil recess may be formed in the core (e.g., stamping, machining). The coil recesses may be a groove formed in a single piece core with an outer diameter wall and an inner diameter wall. The coil recess may be formed in a multi-piece core. The coil recesses may be formed between an inner part and an outer part. The inner part may form an inner diameter wall, a bottom wall, or both. The outer part may include an outer diameter wall, a bottom wall, or both. The core may include and/or be formed of an outer case and an inner case that are connected together.

The outer case may function to form a partial coil recess. The outer case may extend around one or more sides of an electrical coil. The outer case may form a part of an electromagnet. The outer case may extend around two or more sides of a bobbin, an electrical coil, or both. The outer case may include a hole in a center. The outer case may be toroidially shaped. The outer case may be cylindrically shaped. The outer case may be cylindrically shaped with a hole in the center. The outer case may be cylindrically shaped with one or more flanges. The outer case may have a flange that circumscribes the cylindrical portion. The outer case may include an outer case flange. The outer case flange may include an inner flange, an outer flange or both. The inner flange may extend toward a center of the outer case, towards the inner case, or both. The outer case flange may extend away from a center of the case, away from an inner case, or both. The inner flange, the outer flange, or both may carry flux. The inner flange, the outer flange, or both may increase a surface area between the moving plate and the case. The inner flange, the outer flange, or both may assist in providing a large cross-sectional area proximate to the air gap so that the moving plate is attracted towards the core when the electromagnet is powered. The inner flange may contact the inner case and allow flux to flow between the inner flange and the inner case. The inner case may have a length that is determined relative to the wall thickness of the material of the case, the outer case, the inner case, or a combination thereof. The length of the outer case flanges, the inner case flanges, or both may be about 4 times or more, about 5 times or more, about 6 times or more, about 7 times or more, about 8 times or more, about 9 times or more, or even about 10 times or more the wall thickness. For example, if the wall thickness of the material is 1 mm and the length of the flanges if 5 times then the flange will be 5 mm long. The length of the outer case flanges, the inner case flanges, or both may be about 20 times or less, about 15 times or less, or about 12 times or less the wall thickness. The outer case may include one or more legs. The outer case may include one or more legs that are connected to the flange. The outer case may have a recess with a diameter. The diameter of the recess may be sufficiently large to hold an electrical coil, a bobbin, or both. The diameter of the recess may be larger than a diameter of the electrical coil, a bobbin, or both. A diameter of an inside of the outer case may be larger than or substantially the same as an outer diameter of the electrical coil, the bobbin, or both. The outer case may have a center that receives an inner case, the electrical coil, the bobbin, or a combination thereof.

The inner case may function to complete a core. The inner case may function to create part of a coil recess. The inner case may function to extend into and connect to the outer case. The inner case may be press fit into the outer case. The inner case may include a portion that extends into the hole in the outer case. The inner case may extend through the outer case. The inner case may include flanges (i.e., inner case flanges). The inner case flanges may extend from an annular ring of the inner case in a direction parallel to the rotor. The inner case flanges may create a surface area located across from the moving plate. The inner case flanges may assist is creating a magnetic flux that moves the moving plate. The inner case flanges and the outer case flanges may work together to move the moving plate. The inner case flanges may include any of the characteristics discussed herein as to the outer case flanges. The inner case may extend through the hole in the outer case and the flanges of the inner case may connect the inner case and the outer case together. The inner case may be cylindrically shaped. The inner case may have one closed end. The inner case may have one open end. The inner case may have a closed end. The inner case may have a hole in the closed end. The closed end may be the flange. The inner case may extend through a center of the electrical coil, the bobbin, or both. Once the inner case and the outer case are connected together the inner case and the outer case may be locked together. A hole may extend through the inner case. The inner case may form one or more walls of a coil recess. The inner case may form two or more walls of the coil recess. The inner case may have a closed wall that faces the rotor, and the moving plate. The inner case may have an opening that faces away from the rotor and the moving plate. The inner case may be free of legs. The inner case and the outer case when connected together may be adjusted by plastically deforming the one or more legs relative to a static plate so that during elastic recovery an air gap may be created between the moving plate and the rotor, the rotor and the static plate, or a combination thereof.

The one or more legs may extend from the core, the outer case, or both. The one or more legs may function to prevent movement of a static plate. The static plate may be connected to the legs by a fastener (e.g., screw, nail, rivet, or a weld). The static plate may be connected to the core by one or more rivets that extend between legs of the core and the static plate. The one or more legs may prevent rotational movement of the moving plate. The one or more legs may allow for longitudinal movement, axial movement, or both of the moving plate along a longitudinal axis of the motor, the rotational axis of the motor shaft, or both. The one or more legs may prevent the moving plate from radially moving while allowing the compression springs to extend out of holes in the core to axially move the moving plate. The one or more legs may be connected to the static plate by one or more fasteners (e.g., a rivet). The one or more legs may be plastically deformable. The one or more legs may be plastically deformed so that the core may be spaced apart from a moving plate, a rotor, a static plate, or a combination thereof. The one or more legs may be plastically deformable in a controlled manner. The plastic deformation may be controlled by controlling the yield stress of the material of the legs. The legs may be plastically deformed so that upon elastic recovery of the legs a predetermined air gap size is created. The legs may only be plastically deformed during the assembly process. The plastic deformation or yield may be controlled by controlling a width, thickness, length, material type, material yield strength or a combination thereof of the legs. An upper limit (e.g., maximum yield) of the material of the legs, or both may be about 700 MPa or less or about 600 MPa or less. A lower limit (e.g., minimum yield) of the material of the legs, or both may be about 300 MPa or more or about 400 MPa or more. The material yield strength may be controlled to be about 2 percent or less, about 5 percent or less, about 7 percent or less, or about 10 percent or less of the average material yield strength. The material yield strength may be controlled to be about 30 percent or less, about 25 percent or less, about 20 percent or less, or about 15 percent or less of the average material yield strength. For example, if the material has an upper yield of about 700 MP and a lower yield of about 300 MPa and the control of the yield strength is about 10 percent the yield may vary from about 770 MPa to about 270 MPa. A mechanical treatment or heat treatment, before or after forming the legs may be used to enhance control of the yield strength range. The yield may be sufficiently controlled that after plastic deformation of the legs, the elastic recovery is sufficiently controlled that a desired air gap is maintained. The one or more legs may be elastically deformable. Preferably, the one or more legs are only plastically deformable so that when a clamp force is applied between the core and the static plate; the core, moving plate, rotor, and static plate are brought into contact; the one or more legs recover elastically and set the positions of each relative to each other such that an air gap is controlled, independent of the manufacturing tolerances of the pieces of the electromagnet and intervening parts, and created between the outer case and the moving plate; or both. The core may include two or more legs, three or more legs, four or more legs, or even five or more legs. The legs may be equally spaced apart around the outer case. For example, if there are three legs, then each leg may be about 120 degrees apart. The legs may be unequally spaced apart. For example, one leg may be located about 140 degrees from a second and third leg and the second leg and the third leg may be located about 80 degrees apart. The one or more legs may be axially movable (e.g., in a direction parallel to the rotational axis of the rotor). The one or more legs may be an integral part of the core. The one or more legs may be part of the inner case, the outer case, or both. Preferably, the one or more legs are part of the outer case. More preferably, the one or more legs are part of a flange that extends around a central portion of the outer case. The one or more legs may have a connection part that connects each of the legs to the core, the outer case, or both.

The one or more connection parts may function to create a cantilever connection. The one or more connection parts may connect the legs to the core, the outer case, or both. The connection part may extend within a plane. The one or more connection parts may attach each of the legs to the core, the outer case, or both. Preferably, the one or more connection parts are a unitary piece or integral piece of the core, the outer case, or both. The legs may be formed out of a same piece of material as the core, the outer case, or both so that the connection part, the legs, or both are formed by removing material. The connection parts may permit the legs to move relative to the outer case, the core, or both. The connection part may be connection to one or more extension parts. The connection part and the one or more extension parts may be separated by one or more breaks.

The one or more extension parts function to extend from the cover, the outer case, or both to a location of interest, a rivet, or both. The one or more extension parts function to extend the leg away from the core, the outer case, or both. The one or more extension parts may extend within a same plane as the outer case, a flange of the outer case, the core, or a combination thereof. The one or more extension parts may extend between two planes. The one or more extension parts may extend between a first plane and a second plane. The one or more extension parts may extend between a plane with the connection part and a plane with the boss. The one or more extension parts may be linear, curved, straight, have one or more curved sections, one or more angled sections, or a combination thereof. The one or more extension parts may be connected to a connection part at one end and a boss at an opposing end. The boss and the extension part may be separated by one or more breaks.

The one or more bosses may function to connect the core to a static plate. The one or more bosses may function to connect a leg to a rivet. The one or more bosses may connect the leg to a static plate via a rivet. The one or more bosses may be located within a plane. The one or more bosses may include one or more leg recesses.

The one or more leg recesses may include one or more fasteners. The one or more leg recesses may be a through hole in the boss. The one or more leg recesses may be reinforced. The one or more leg recesses be an absence of material. The one or more leg recesses may hold a rivet and prevent the rivet from moving with the moving plate. The one or more leg recesses may assist in connecting the core to the static plate. The one or more leg recesses may be located proximate to one or more cutouts.

The one or more cutouts may be formed by removing material. The one or more cutouts may be an absence of material. The one or more cutouts may permit the legs to deform in plane (e.g., from side to side), out of plane (e.g., up and down), or both. The one or more cutouts may vary an amount of force required to plastically deform each of the legs. The one or more cutouts may be located in the connection part, the extension part, the boss, or a combination thereof. Preferably, the one or more cutouts are located in the extension part. The one or more cutouts may assist in deformation. The one or more cutouts may assist a deformation control region in deforming the one or more legs.

The one or more deformation control regions may assist the legs or a part of the legs in plastically deforming. The one or more deformation control regions may create a region or area that deforms. The one or more deformation control regions may allow one region to plastically deform and another region to remain intact (e.g., non-deformed). The one or more deformation control regions may be a weakened area, an area with a reduced width, an area with a reduced thickness, or a combination thereof. The one or more deformation control regions may extend through the leg. The deformation control regions may reduce a width of each of the legs. The deformation control regions may have a width that is about 95% or less, about 90% or less, about 85% or less, about 80% or less, or about 75% or less of a width of the leg of the surrounding regions (e.g., connection part, extension part, boss). The deformation control regions may have a width that is about 50% or more, about 60% or more, or about 70% or more of the width of the surrounding regions. For example, if the connection part has a width that is about 10 mm and the deformation control region has a width that is 75% the deformation control region will have a width that is about 7.5 mm. The one or more deformation control regions may include a cutout that may be circular, square, round, rectangular, oval, a line, a curved line, or a combination thereof. The one or more deformation control regions may be located in or proximate to the connection part, the extension part, the boss, a break, or a combination thereof.

The one or more breaks function to curve a part of the leg from a first plane to a second plane. The one or more breaks function to stiffen a part of a leg. The one or more breaks may create a location that plastically deforms. Preferably, the one or more breaks prevent deformation so that regions that include breaks are strengthened relative to regions surrounding the breaks. The one or more breaks may be a scoring of a leg. The one or more breaks may be a weakening of the material of the leg. The one or more breaks may be a pre-bend in a leg. The one or more breaks may separate the parts of the legs.

The one or more holes in the core may function to maintain the location of the compression springs relative to the moving plate, the core, or both. The one or more holes may receive a portion of the compression springs. The one or more holes may entirely receive the compression springs when the moving plate is in the brake released position.

The one or more compression springs may function to axially move a moving plate relative to the length of motor, motor brake, or both. The one or more compression springs may create a braking force, stop a motor, slow a motor, create a parking brake force, maintain a parking brake force, prevent back drive, or a combination thereof. The one or more compression springs may be a plurality of compression springs. Preferably, the motor brake includes two or more, three or more, four or more, or five or more compression springs. The one or more compression springs may be helical springs that may be compressed and store energy and then release the energy at a later time. The one or more compression springs may be a rubber member that may be compressed and may expand. The one or more compression springs may be made of or include metal, rubber, an elastic material, an elastically deformable material, or a combination thereof. The one or more compression springs may be a spring like member, but may not be a spring (e.g., a solid piece of rubber, or a piece of plastic or rubber having a special shape so that the rubber deforms). The one or more compression springs may be sufficiently strong to move a moving plate. The one or more compression springs may be sufficiently strong to move a moving plate into contact with a rotor and to prevent rotation of the rotor. The one or more compression springs may be sufficiently strong to create a braking force but not so strong that an electromagnetic coil cannot compress the one or more compression springs and move the moving plate away from rotor.

The motor brake may include one or more electromagnets. Preferably, the motor brake includes one electromagnet that includes an electrical coil. The electromagnet may be a combination of the core and the electrical coils. The electrical coil may cooperate with the core to form an electromagnet able to move the one or more moving plates. The electromagnet may function to overcome the force of the compression springs to allow for the motor to create a brake apply or to release a brake apply. The electromagnet may move the moving plate away from the rotor so that the rotor can rotate to apply or release the parking brake. The electromagnet may create a sufficient magnetic field to overcome the force of the compression spring so that the moving plate is moved in a direction opposite the spring force. The electromagnet functions only when current is supplied. Preferably, the electromagnet moves the moving plate in one direction and the compression springs move the moving plate in an opposing direction. The electrical coils may be wrapped around a bobbin or be in communication with a bobbin.

The bobbin may function to receive the electrical coils. The electrical coils may be wrapped around the bobbin. The bobbin may support the electrical coils. The bobbin and electrical coils may form one piece.

The one or more moving plates may function to axially move and create a braking force. The one or more moving plates may function to prevent a rotor from rotating. The one or more moving plates may axially move relative to a longitudinal axis of the motor, the motor brake, the electromagnetic brake, or a combination thereof. The moving plate may have one or more solid surfaces. The moving plate may include one or more through holes. The moving plate may include one through hole. The moving plate may be made of or include, metal or other magnetic material, a friction material, or a combination thereof. The moving plate and core may be made of electrical steel. The moving plate may include a high friction surface (e.g., metal fibers, metal powder, ceramic, or a combination thereof may be added to the moving plate or a surface of the moving plate). The moving plate may have a forward contact surface, a rearward contact surface, or both (hereinafter contact surface). Preferably, only one of the contact surfaces is moved into contact with a rotor. The contact surfaces may be parallel to each other. The contact surfaces may be smooth. The contact surfaces may include raised portions. The raised portions may be complementary to a surface of the rotor. The moving plate may include one or more recesses.

The one or more moving recesses may function to prevent radial movement or rotational movement, or both, of the moving plate. The one or more recesses may allow for axial movement of the moving plate relative to a length of the motor, the motor brake, or both. The one or more recesses may be a through hole in the moving plate. The one or more recesses may be an absence of material in the moving plate. The one or more recesses may be a plurality of recesses. When more than one recess is present the recesses may be evenly spaced apart. The recesses may be about 180 degrees or less, about 150 degrees or less, about 120 degrees or less, about 90 degrees or less, or about 75 degrees or less apart. The recesses may be about 45 degrees or more or about 60 degrees or more apart (i.e., about 120 degrees apart). Preferably, the moving plate includes three recesses. The recesses may allow the moving plate to axially move into contact with a rotor.

The one or more rotors may function to rotate with the motor. The one or more rotors may function to be connected to the motor and prevent movement of the motor when the motor is turned off. The one or more rotors may be connected to a motor shaft so that when the motor is off the rotor stops the motor from moving. The rotor may be axially or longitudinally static relative to the motor, the motor brake, or both. The rotor may move relative to the driver (i.e., along an axis of the motor shaft). The rotor may axially or longitudinally move relative to a length of the motor, the motor brake, or both so that the rotor is moved into contact with the static plate. The rotor may be a solid piece of friction material (e.g., a material of a brake pad or a clutch plate), metal, plastic, or a both. The rotor may be made of any piece of material that is capable of being contacted by a static plate, a moving plate, or both and withstanding the contact over time so that continual motor braking is created. The rotor may withstand 1,000 or more contacts, preferably 10,000 contacts, more preferably 100,000 contacts, or even 1,000,000 or more contacts while maintaining a braking force so that the motor does not slip or move. The rotor may be hermetically sealed within a motor gear unit. The rotor may be in direct contact with a motor shaft. Preferably, the rotor includes a through hole that receives the motor shaft, the driver, or both. The rotor includes one or more contact surfaces on each side of the rotor.

The contact surfaces function to be a surface that when contacted slows or stops the motor. The contact surfaces may have an area that is substantially the same area as a face of the rotor. The contact surfaces may be located in a single plane. The contact surfaces may be located in the same plane as a face of the rotor. The contact surfaces may be raised above a face of the rotor. The contact surfaces may be a raised annular ring. The contact surfaces may be a raised annular ring that shares an outer diameter with the rotor. The face of the rotor may be recessed relative to a face of the rotor. The contact surfaces may be mirror images of each other. For example, if a contact surface is raised on a first side then the contact surface is raised on the second side. The contact surface may be on a first side, a second side, or both sides of the rotor. One contact surface may be raised and one contact surface may be coplanar with a face of the rotor. The contact surfaces may have a radial width. The radial width may be a distance from one edge of the contact surface to a second edge of the contact surface when measured in a radial direction. The radial width may be measured from an outer diameter of the contact surface, the rotor, or both to an inner diameter of the contact surface. The radial width may be about ¼ or less, about 3⁄16 or less, about ⅛ or less, about 3⁄32 or less, about 1⁄16 or less, or about 1⁄32 or less of outer radius of the rotor. For example, if the outer radius (e.g., measured from a center of the rotor to an outer edge of the rotor) of the rotor is 10 mm and the contact surfaces are ¼ of the rotor then the radial width is about 2.5 mm. The radial width may be about 1⁄128 or more or preferably about 1⁄64 or more of an outer radius of the rotor. The contact surface may be a surface of the rotor that contacts the moving plate, the static, plate, or both. The contact surface may be determined by a radial width of the contact region of the moving plate, the static plate, or both. For example, one or both faces of the rotor may be planar and only a portion of the rotor may contact the moving plate, the static plate, or both. The contact surfaces may be made of the same material as the rotor. The contact surfaces, the rotor, or both may be made of aluminum, a composite resin-based material typical of automotive friction materials, a polymer, acrylic, or both. The contact surfaces may be coated with a material. The contact surfaces may be hardened, modified, or both. The contact surfaces may be infused with a material that changes a coefficient of friction of the material. For example, metal may be embedded in a polymer rotor. The contact surfaces when in contact with both a moving plate and a static plate may slow or stop movement of a motor through an engagement recess within the rotor.

The engagement recesses may function to connect the rotor to a motor shaft. The engagement recesses may be a through hole in the rotor that receives all or a portion of the motor shaft. The engagement recesses may be a geometric shape. The engagement recesses may be square, oval, rectangular, pentagonal, a rhombus, or a combination thereof. The one or more engagement recesses may decelerate or stop the motor shaft when the rotor is decelerated or stopped. The one or more engagement recesses may be used in lieu of the drivers.

The one or more drivers may function to transfer energy, torque, or both from the motor shaft to a rotor and vice versa. A plurality of drivers may be present. Preferably, only a single driver is present. The driver may pass through a static plate. The driver may be keyed to the motor shaft. The driver may prevent the rotor from slipping relative to the motor shaft. The driver may be keyed to the rotor. The motor brake may be free of a driver.

The static plate may function to contact one side of a rotor. The static plate may create friction on one side of a rotor. The static plate may assist in creating a braking force, preventing the rotor from moving, braking the motor, or a combination thereof. The static plate may be free of rotational movement. The static plate may be free of longitudinal or axial movement. The static plate may have one or more solid surfaces. The static plate may include one or more through holes. The static plate may include one through hole. The static plate may include a hole in the center. The static plate may be made of metal, a friction material, or both. The static plate may include a high friction surface (e.g., metal fibers, metal powder, ceramic, or a combination thereof may be added to the moving plate or a surface of the moving plate). The static plate may have a forward contact surface, a rearward contact surface, or both (hereinafter contact surface). Preferably, only one of the contact surfaces contacts a rotor. A contact surface of the static plate, the moving plate, or both may be formed by bending or removing a portion of the moving plate, the static plate, or both so that only a portion of the rotor is contacted. The contact surfaces may be parallel to each other. The contact surfaces may be smooth. The contact surfaces may include raised portions. The raised portions may be complementary to a surface of the rotor. The static plate may be substantially identical to the moving plate. The static plate may be permanently connected to the core, the motor, or both. The static plate may be static and the rotor may be moved by the moving plate into contact with the static plate. The static plate and moving plate may trap the rotor therebetween to create a braking force, prevent movement of the motor, or both.

The motor, the electrical coil, or both may be attached to one or more wires. The one or more wires may supply current to the motor so that the motor releases or creates a braking force. The one or more wires may supply current to the electromagnet to retract the moving plate, release the rotor, or both. The one or more wires may power the electromagnet so that the moving plate is moved along the longitudinal axis.

The longitudinal axis extends along the length of the motor, the motor brake or both. Preferably, the longitudinal axis extends along a major dimension of the motor, motor brake, or both. The longitudinal axis may be the same as the rotational axis of the motor. More preferably, the longitudinal axis and the rotational axis are parallel or in line.

When the moving plate is in the brake on position the compression springs may force the moving plate into contact with the rotor so that a gap exists between the moving plate and the core. The gap may be sufficiently large so that the moving plate moves away from the rotor during apply or release of the parking brake. The gap may be about 0.001 mm or more, about 0.002 mm or more, or about 0.005 mm or more. The gap may be about 0.5 mm or less, about 0.02 or less, or about 0.1 mm or less. The gap may be sufficiently large that when the motor brake is released and the moving plate moves into contact with the core, an air gap exists between the moving plate and the rotor so that the parking brake may be applied or released.

The air gap may be a gap on one or both sides of the rotor. Preferably, an air gap is present between the rotor and the moving plate. The air gap may be sufficiently large so that the rotor rotates when the electromagnetic brake is powered (i.e., the electrical coils are moving the moving plate away from the rotor). The air gap may be sufficiently small so that the magnetic flux of the electromagnet can span the air gap and move the moving plate. The air gap may be determined based on the wall thickness of the material of the core. The air gap may be about 50 percent or less, about 40 percent or less, preferably about 30 percent or less, more preferably about 20 percent or less, or even about 10 percent or less, the wall thickness of the material of the core. The air gap may be between about 10 percent and about 50 percent the wall thickness (e.g., average wall thickness) of the core. For example, if the wall thickness is 1 mm and the air gap is 10%, the air gap will be 0.1 mm. The air gap, the core, the electromagnet, or a combination thereof may be formed by the method taught herein.

The method may include one or more steps that may be performed in virtually any order. The method may include a step of forming a core by pressing an inner case into an outer case. One or more electrical coils may be installed into the core. Rivets may be attached to the core. Rivets may be attached into holes (e.g., leg recesses) in the outer case. Springs may be installed over the rivets. A moving plate may be placed proximate to the springs, the core, or both. A rotor may be installed between the moving plate and the static plate. The static plate may be connected to the core. Legs of the core may be connected to the static plate, rivets, or both. The legs may be plastically deformed. The legs may be plastically deformed by a controlled axial clamp force being applied between the outer case and the static plate. The rotor may be sandwiched between the static plate and the moving plate. A shaft of the motor may extend into the rotor or a driver. The electromagnetic brake may be connected to a motor.

FIG. 1 illustrates a brake assembly 2. The brake assembly 2 includes a motor gear unit 4 and a caliper 6. The caliper 6 has a pair of opposing brake pads 8 that are moved by a piston (not shown) sliding inside a piston bore (not shown) within the caliper 6. During hydraulic operation the piston (not shown) movement is caused by hydraulic pressure and during an electric brake apply by the motor gear unit 4 and a rotary to linear actuator (not shown).

Figure 1A:
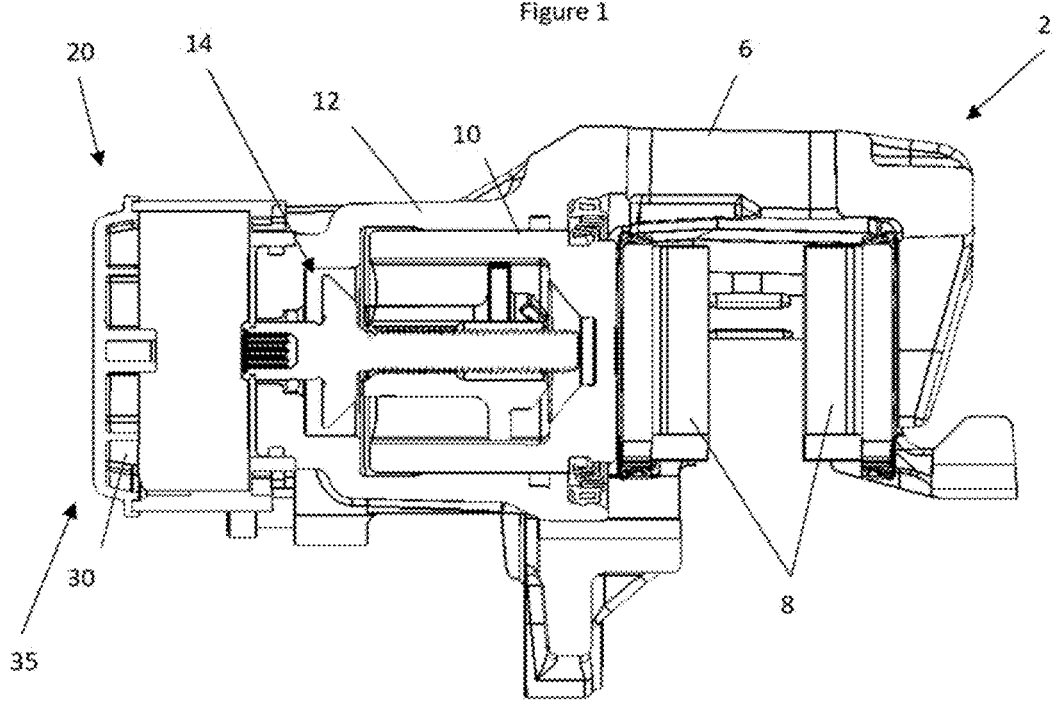
FIG. 1A is a cross-sectional view of the brake assembly of FIG. 1.

FIG. 1A illustrates a cross-sectional view of the brake assembly 2 of FIG. 1. The brake assembly 6 includes a caliper 2 with a pair of opposing brake pads 8. One of the brake pads 8 are in contact with a piston 10. The piston 10 is located within a piston bore 12. The piston bore 12 includes hydraulic fluid (not shown) and a rotary to linear actuator 14 that electrically moves the piston 10 when the motor 20 is turned on. The motor gear unit 4 includes a motor 20 and an electromagnetic brake 30 with an electromagnet 35.

Figure 2:
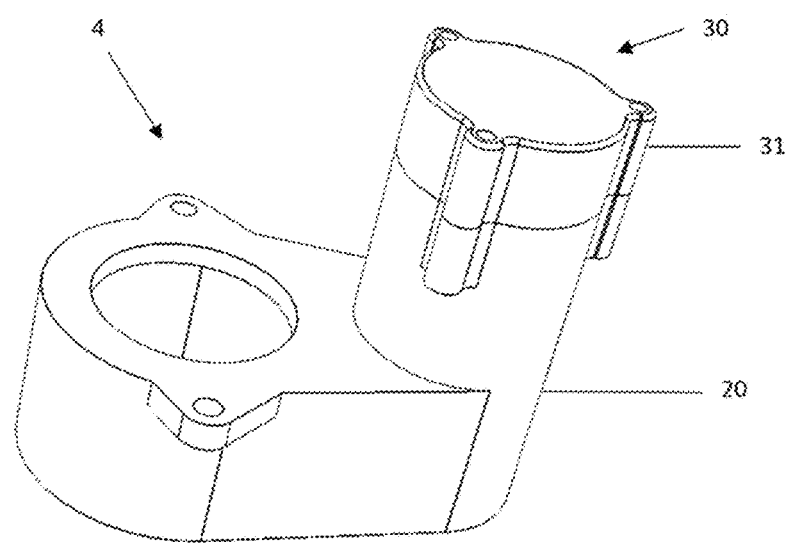
FIG. 2 is a perspective view of a motor gear unit.

FIG. 2 illustrates a motor gear unit 4. The motor gear unit 4 includes a motor 20 and an electromagnetic brake 30 with a housing 31.

Figure 3:
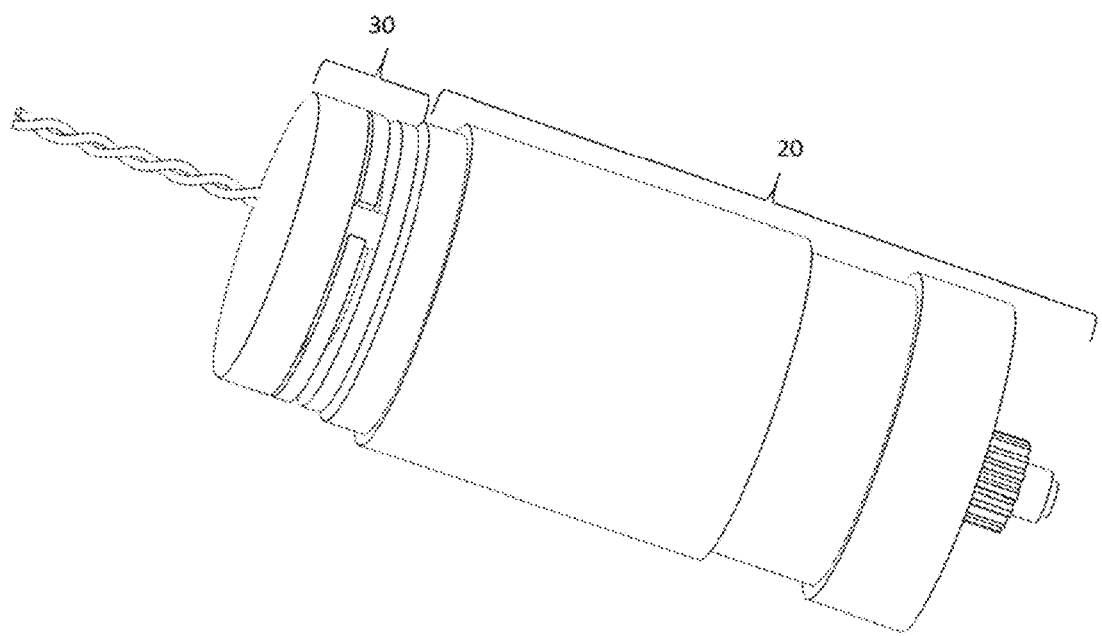
FIG. 3 is a perspective view of a motor and a motor brake.

FIG. 3 illustrates a motor 20 with an electromagnetic brake 30.

Figure 4:
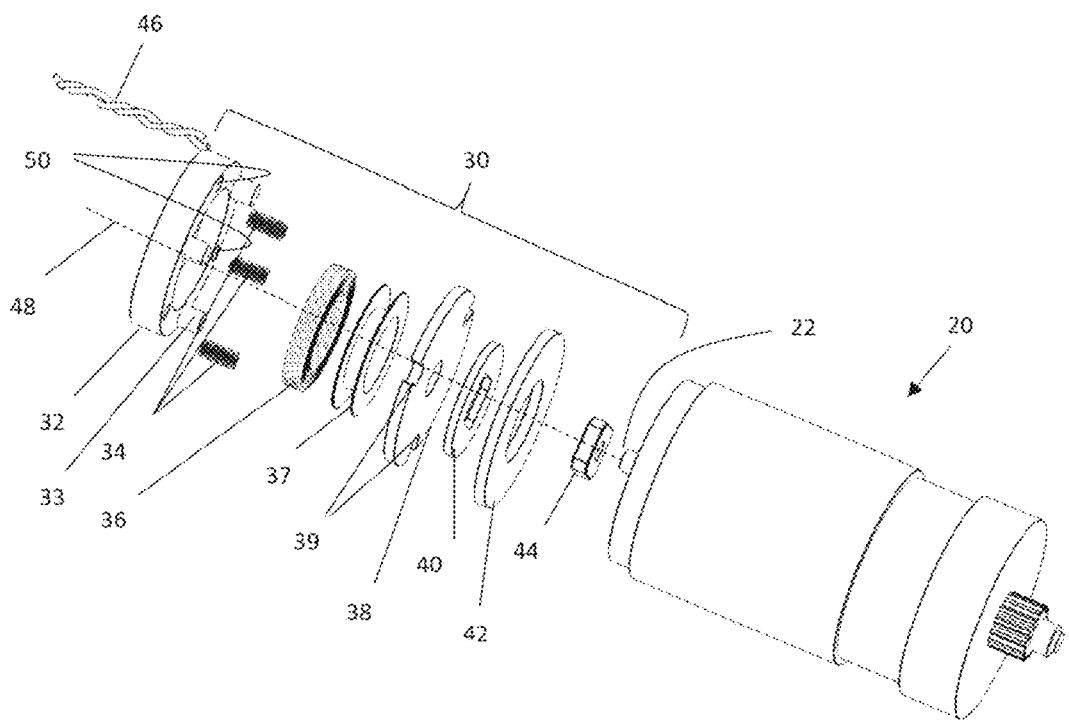
FIG. 4 is an exploded view of the motor and motor brake of FIG. 3.

FIG. 4 illustrates a motor 20 with an exploded electromagnetic brake 30. The electromagnetic brake 30 is in communication with a motor shaft 22 of the motor 20 and the electromagnetic brake 30 prevents movement of the motor 20 when the motor 20 is in the off condition. The electromagnetic brake 30 is connected to wires 46 and includes a core 32 with holes 50 that at least partially receive the compression springs 34. The electrical coils 36 extend around a bobbin 37 and the electrical coils 36 and bobbin 37 fit at least partially within the core 32. The core 32 includes legs 33 which extend axially from the core 32. The legs 33 are connected to the static plate 42 and prevent the static plate 42 from moving. The legs 33 extend through recesses 39 within a moving plate 38 so that the moving plate 38 can move axially along the legs 33. A rotor 40 is located between the moving plate 38 and a static plate 42 which is fixed to the legs 33. The rotor 40 is connected to a drive 44 that transfers torque from the motor shaft 22 to the rotor 40. When there is no current in the electrical coils 36, the rotor 40 is trapped between the static plate 42 and the moving plate 38 under the load of the compression springs 34. When current is applied to the electrical coils 36 the moving plate 38 is magnetically attracted to the core 32 and moves along the longitudinal axis 48 into contact with the core, compressing the springs 34 and releasing the rotor 40 which is then free to rotate with the drive 44 and motor shaft 22

Figure 5:
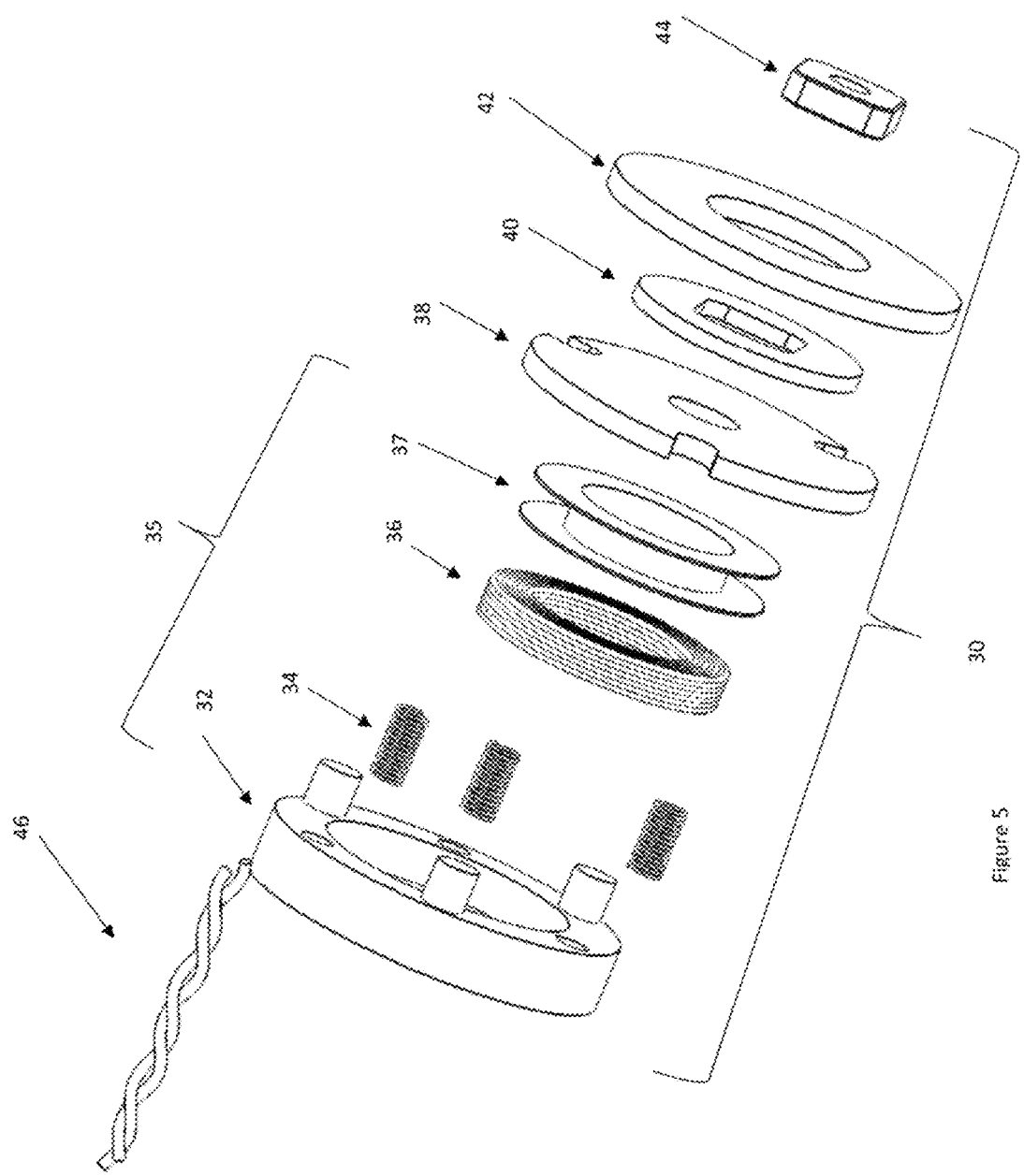
FIG. 5 is a perspective exploded view of the motor brake.

FIG. 5 illustrates a close-up of an exploded electromagnetic brake 30. The electromagnetic brake 30 includes an electromagnet 35 connected to wires 46. The electromagnet 35 includes an electrical coil 36 inside of a core 32, and the core 32 being in communication with a plurality of compression springs 34. An electrical coil 36 is wrapped around a bobbin 37 and the electrical coil 36 and the bobbin 37 are located within the core 32. The electrical coil 36 move the moving plate 38 when the electrical coil 36 is on and the compression springs 34 move the moving plate 38 in an opposing direction when the electrical coil 36 is off. A rotor 40, which is communication with a driver 44 is located between the moving plate 38 and a static plate 42.

Figure 6A:
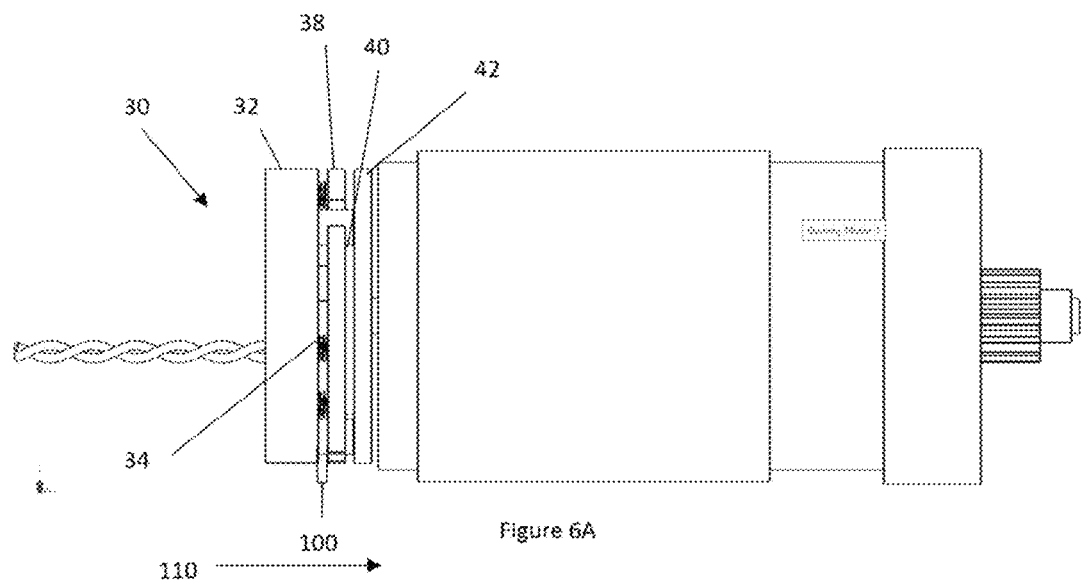
FIG. 6A is the motor brake in the brake on position (e.g., deactivated condition (i.e., when the motor is off))

FIG. 6A illustrates the electromagnetic brake 30 in a brake on position with a moving plate 38 moved in the direction 110. As shown, the compression springs 34 push on the moving plate 38 so that the moving plate contacts a rotor 40 on a first side and pushes the rotor into contact with a static plate 42 on a second side of the rotor 40. The compression springs 34 create a gap 100 between the core 32 and the moving plate 38.

Figure 6B:
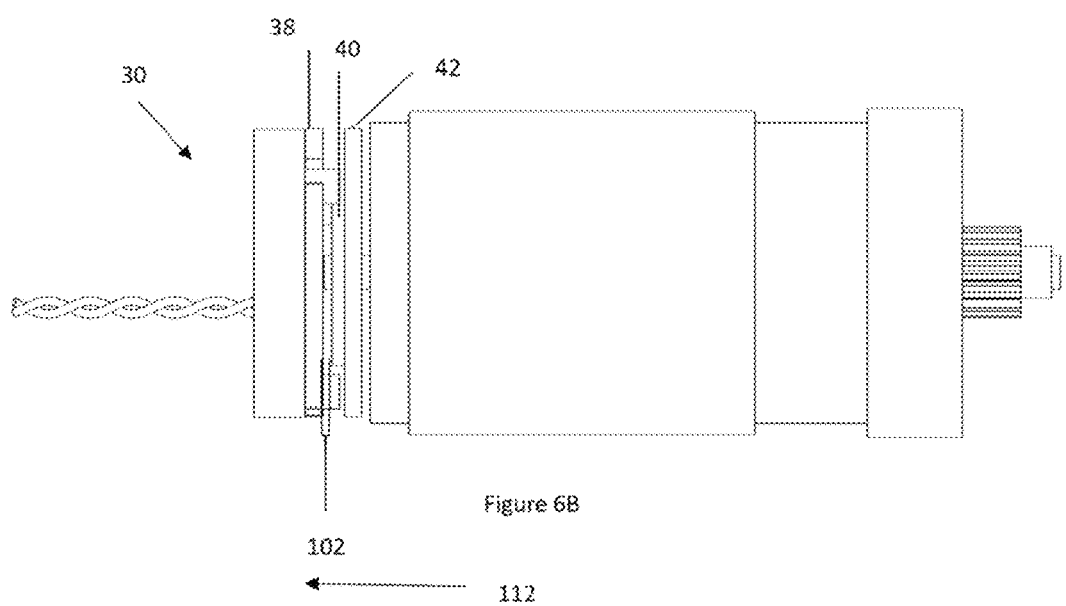
FIG. 6B is the motor brake in the brake release position (e.g., activated condition (i.e., when the motor is on))

FIG. 6B illustrates the electromagnetic brake 30 in a brake release position with the moving plate 38 moved in the direction 112. In the brake release position, the electrical coil 36 is energized and creates a magnetic force that overcomes the compression springs (not shown). The moving plate 38 is moved towards the core 32 and an air gap 102 is created between the moving plate and the rotor 40. The removal of the compression spring loads allows the rotor 40 to rotate freely with the drive 44 and motor shaft 22.

Figure 7:
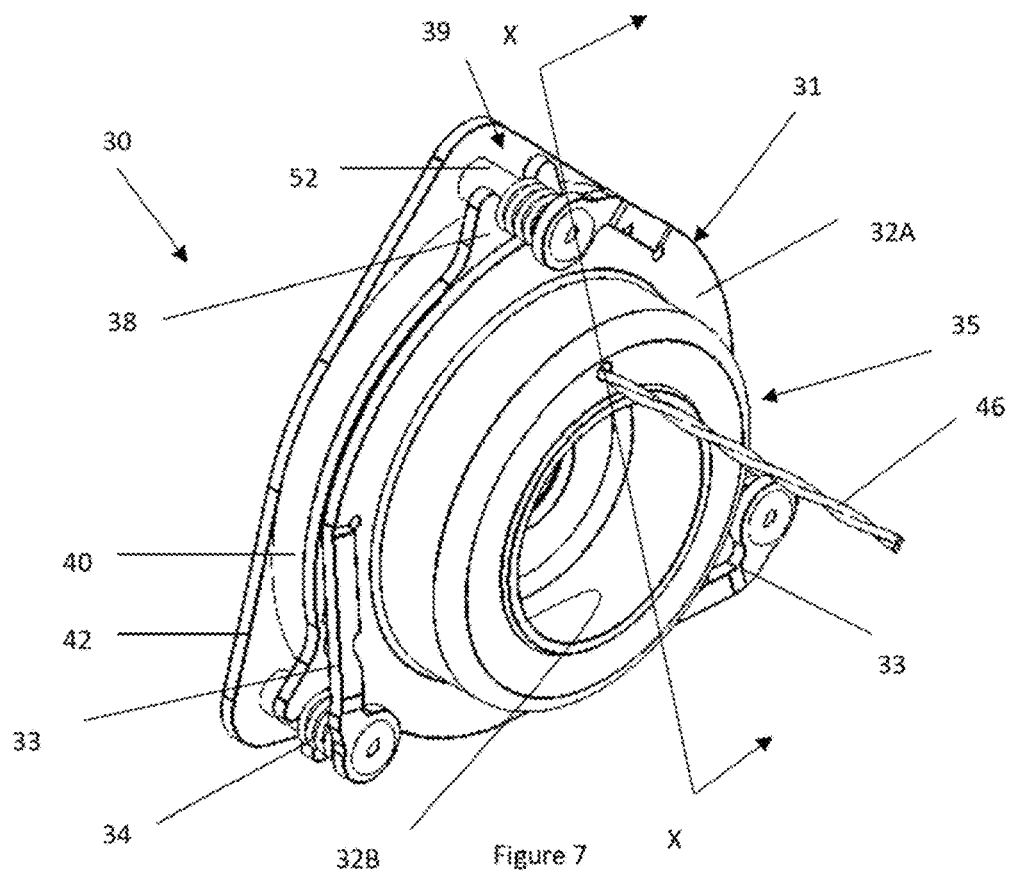
FIG. 7 is a perspective view of a motor brake.

FIG. 7 is a perspective view of an electromagnetic brake 30. The electromagnetic brake 30 includes a core 32 having an outer case 32A and an inner case 32B press fit into the outer case 32A. The outer case 32A includes a plurality of legs 33 that are connected to a rivet 52. The rivets 52 extend from the legs 33 through recesses 39 in a moving plate 38 and connect to a static plate 42. A compression spring 34 extends over the rivet 52 and applies a force to the moving plate 38. During a vehicle brake application or release (i.e., when the motor and electromagnet are activated), the moving plate is attracted and moved towards the core 32 (compressing the spring 34) allowing the rotor 40 to rotate. When the vehicle brake has achieved an applied or released condition (i.e., the motor and electromagnet are deactivated) the rotor 40 is sandwiched between the static plate 42 and moving plate 38 by the compression spring 34 exerting a force on the moving plate 38. Wires 46 extend into the outer case 32A to power the electromagnet 35.

Figure 8:
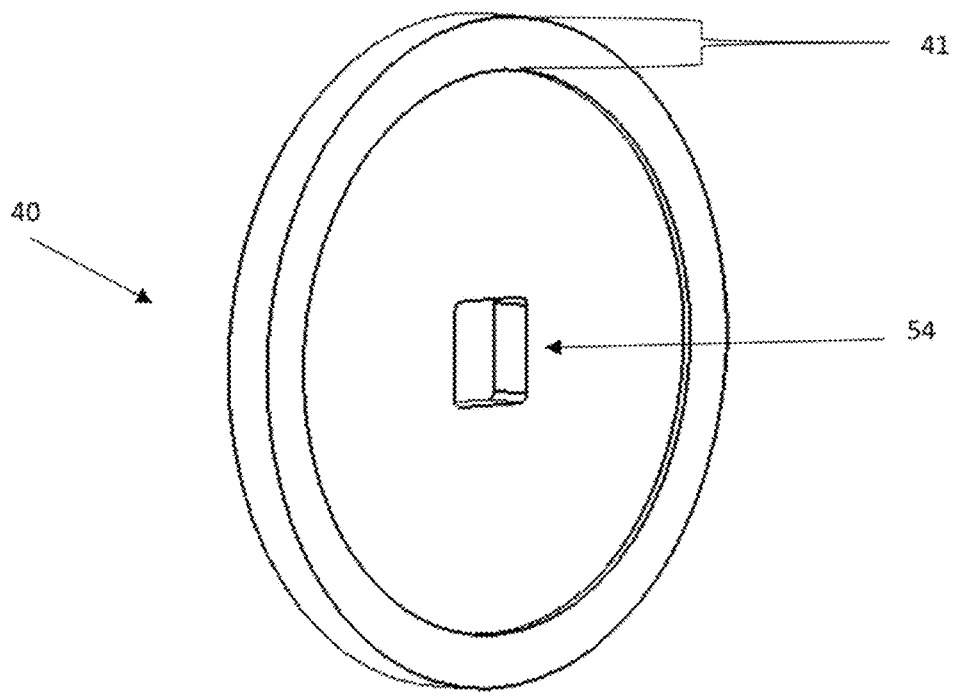
FIG. 8 is a perspective view of a rotor.

FIG. 8 illustrates a perspective view of a rotor 40. The rotor includes a contact surface 41 that is an annular ring. A center of the rotor 40 includes an engagement recess 54 for receiving a shaft of a motor (not shown).

Figure 9:
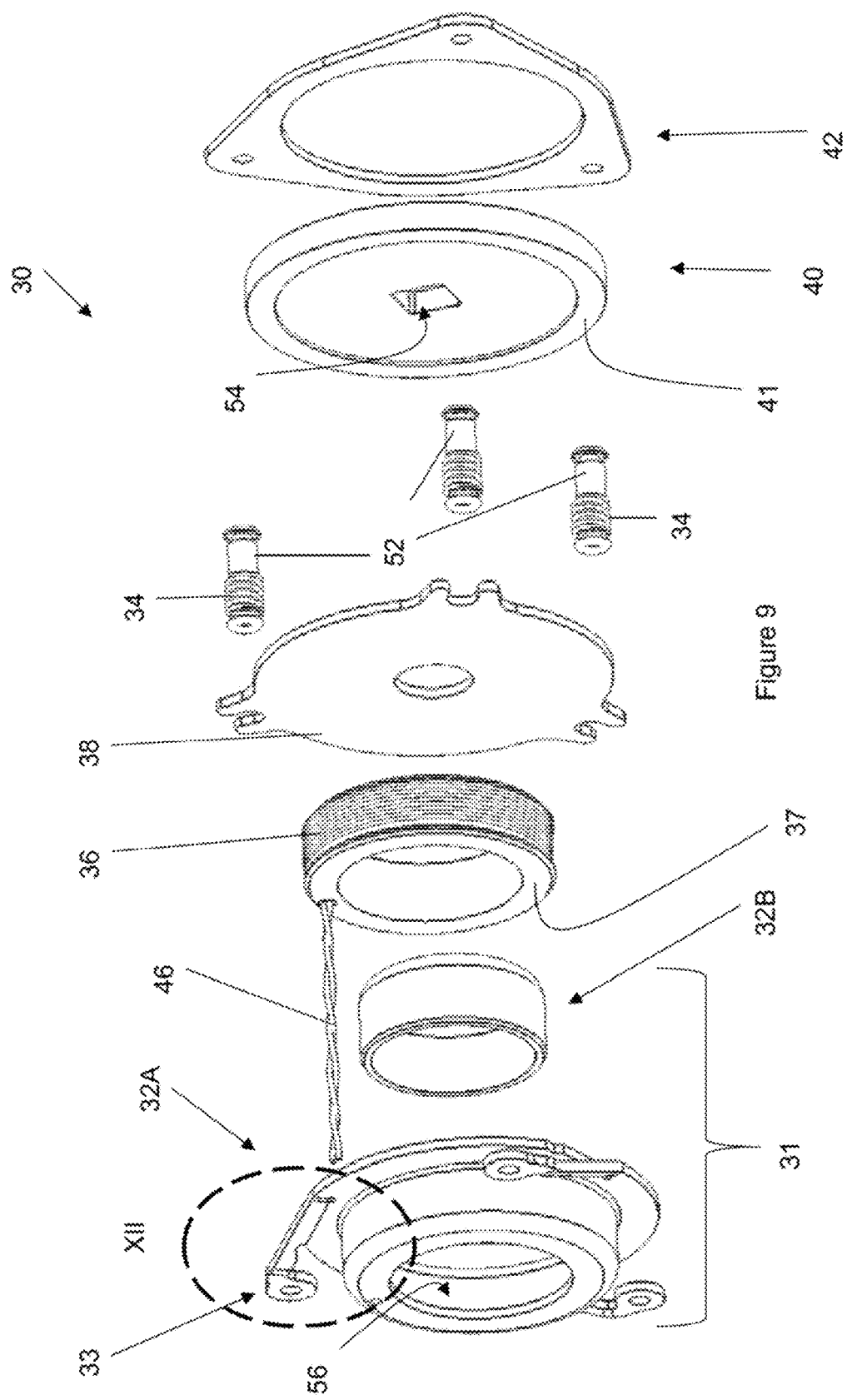
FIG. 9 is an exploded view of the motor brake of FIG. 7.

FIG. 9 is an exploded view of the electromagnetic brake 30 of FIG. 7. The electromagnetic brake 30 includes a core 32 having an outer case 32A with a plurality of legs 33 and an inner case 32B that when connected to the outer case 32A form a coil recess 56 that receives a bobbin 37 and electrical coil 36. The electrical coils 36 have wires 46 that power the electrical coils 36. The electrical coils 36 are located between the core 32 and a moving plate 38 that moves along rivets 52 when the electrical coils 36 are activated. A compression spring 34 extends over each rivet 52 that moves the moving plate 38 when the electrical coils 36 are off so that the moving plate 38 contacts the rotor 40. The rotor 40 includes contact surfaces 41 and an engagement recess 54 that extends through a center of the rotor 40 to connect to a rotor shaft (not shown). The rotor 40 contacts the moving plate 38 on a first side and the static plate 42 on a second side.

FIG. 10 is a cross-sectional view of the electromagnetic brake 30 of FIG. 7 cut along line X-X. The outer case 32A and the inner case 32B are connected together forming a coil recess 56 that houses the electrical coil 36 and bobbin 37. The inner case 32B forms one wall of the coil recess 56 and the outer case 32B forms two walls of the coil recess 56. A moving plate 38 is located proximate to the coil recess 56. A rotor 40 is located between the moving plate 38 and the static plate 42. The rotor 40 includes two contact surfaces 41 that prevents the motor shaft (not shown) from moving when the motor (not shown) is turned off.

FIG. 11 is a close-up view of the coil recess 56 and associated parts of FIG. 10 in area XI. The outer case 32A and the inner case 32B form the coil recess 56 that houses the electrical coil 36 and the bobbin 37. The inner case 32B includes a single annular inner case flange 140 that includes a through hole. The outer case 32A includes two outer case flanges 130. The outer case flanges 130 consist of an inner flange 132 that extends towards the inner case 32A and an outer flange 134 that extends away from the inner case 32B. Arrows are included around the electrical coils that indicate the flow direction of flux 150 through the core, between the inner case 32B and the outer case 32A and through the moving plate 38. The direction of the flow may be clockwise or counterclockwise depending on the direction of current in the coil. As shown, the electromagnet 35 is off (i.e., brake on) and the moving plate 38 is held in contact with the rotor 40 by the compression springs 34 (not shown) so that the rotor 40 is sandwiched between the moving plate 38 and the static plate 42. In this condition, a gap 100 exists between the electromagnet 35 and the moving plate 38.

Figure 12:
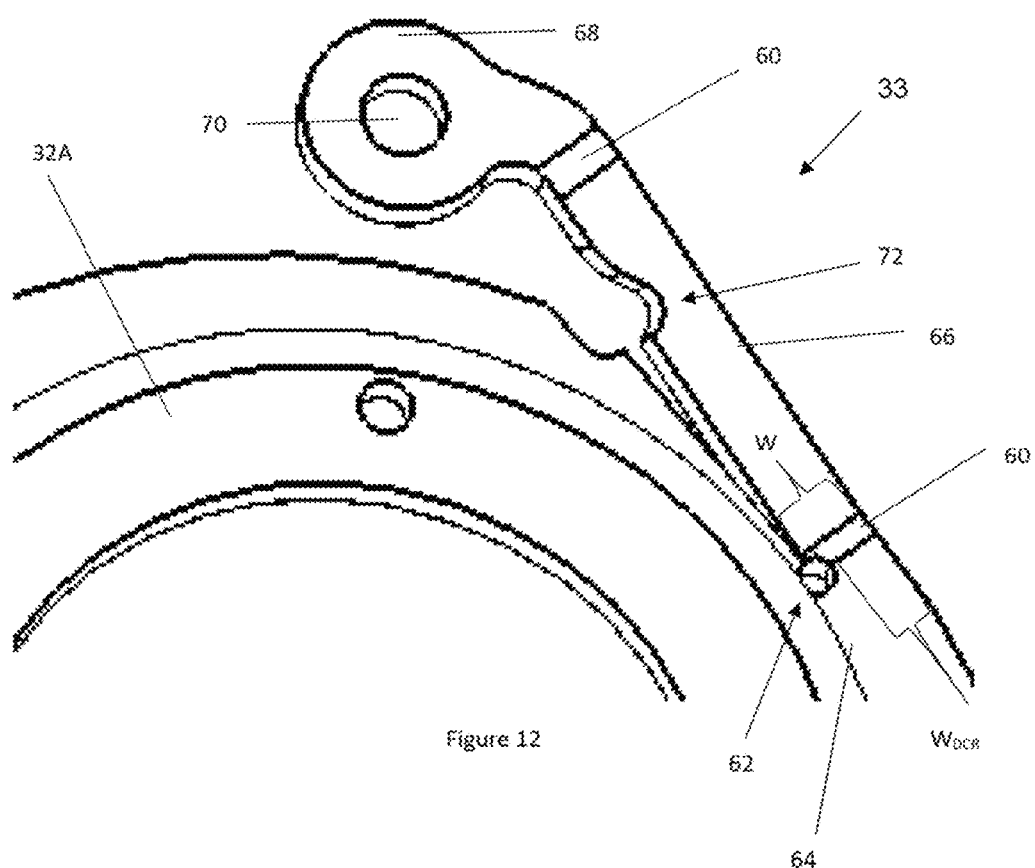
FIG. 12 is a close-up view of a leg of FIG. 9 in area XII.

FIG. 12 is a close-up view of the leg 33 of FIG. 9 in area XII. The leg 33 includes a connection part 64 where the leg 33 attaches to the outer case 32A. A deformation control region 62 is located proximate to the connection part 64 so that the amount of force needed to deform the leg 33 can be varied. The deformation control region 62 has a width ($W_{DCR}$) that is less than a width (N) of the surrounding parts (e.g., connection part 64, extension part 66, boss 68) and the width ($W_{DCR}$) of the deformation control region 62 assists in controlling the amount of deformation of the leg 33. A break 60 joins the connection part 64 to the extension part 66. The extension part 66 includes a cut out 72 and the extension part 66 extends between the breaks 60. The second break 60 joins the connection part 64 to the boss 68, which includes a leg recess 70 to receive a rivet (not shown).

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Brake Assembly
4 Motor Gear Unit
6 Caliper
8 Brake pads
10 Piston
12 Piston Bore
14 Rotary to Linear Actuator
20 Motor
22 Motor Shaft
30 Electromagnetic Brake
31 Housing
32 Core
32A Outer Case
32B Inner Case
33 Legs
34 Compression spring
35 Electromagnet
36 Electrical coil
37 Bobbin
38 Moving plate
39 recess
40 Rotor
41 Contact Surface
42 Static Plate
44 Driver
46 Wires
48 Longitudinal Axis
50 Holes
52 Rivet
54 Engagement Recess
56 Coil Recess
60 Break
62 Deformation Control Region
64 Connection Part
66 Extension Part
68 Boss
70 Leg Recess
100 Gap
102 Air gap
110 Braking direction
112 Running direction.
130 Outer Case Flange
132 Inner Flange
134 Outer Flange
140 Inner Case Flange
150 Flux Path

I claim:
1. A brake assembly comprising:
 a. a caliper including:
  i. one or more pistons,
 b. one or more rotary to linear actuators that provides an axial force to move the one or more pistons,
 c. a motor gear unit in communication with the one or more rotary to linear actuators, the motor gear unit including:
  i. a motor, and
  ii. an electromagnetic brake that prevents movement of the motor gear unit, the one or more pistons, or both when the motor is turned off so that a brake apply is maintained; and
 wherein the electromagnetic brake includes a core having a plurality of legs and each of the plurality of legs are plastically deformable during an assembly process.

2. The brake assembly of claim 1, wherein the one or more rotary to linear actuators are a ball screw or a ball ramp.

3. The brake assembly of claim 2, wherein the electromagnetic brake includes a core with a plurality of holes that each receive all or a portion of one of a plurality of compression springs, the core housing all or a portion of an electrical coil, a bobbin, or both.

4. The brake assembly of claim 2, wherein the plurality of legs extend axially from the core.

5. The brake assembly of claim 3, wherein the electromagnetic brake includes a moving plate that slides axially along the plurality of legs of the core so that the moving plate is prevented from rotating.

6. The brake assembly of claim 5, wherein the moving plate is moved in a braking direction by the plurality of compression springs and is moved in a release direction by the electrical coil.

7. The brake assembly of claim 6, wherein the moving plate in a brake on position contacts a rotor on a first side and urges the rotor toward a static plate so that the static plate contacts the rotor on a second side, preventing rotation of the rotor, and the plastic deformation of the plurality of legs during the assembly process maintains an air gap between the core and the moving plate.

8. The brake assembly of claim 1, wherein the electromagnetic brake includes a rotor that is in communication with a motor shaft of the motor so that the motor rotates the rotor.

9. The brake assembly of claim 1, wherein the core is a single piece.

10. The brake assembly of claim 1, wherein the core includes in inner case and an outer case that are connected together to form a coil recess therebetween.

11. A brake assembly comprising:
a. a caliper including:
  i. one or more pistons,
b. one or more rotary to linear actuators that provides an axial force to move the one or more pistons,
c. a motor gear unit in communication with the one or more rotary to linear actuators, the motor gear unit including:
  i. a motor, and
  ii. an electromagnetic brake that prevents movement of the motor gear unit, the one or more pistons, or both when the motor is turned off so that a brake apply is maintained, the electromagnetic brake including:
    1. a core having a wall thickness and one or more flanges, wherein the one or more flanges have a radial width that is about four times to about ten times the wall thickness.

12. The brake assembly of claim 11, wherein the core has an inner case press fit into an outer case and the inner case and the outer case have a uniform wall thickness; the one or more flanges of the core being one or more inner case flanges and one or more outer case flanges; and the one or more inner case flanges and the one or more outer case flanges have a radial width that is about four times to about ten times the wall thickness.

13. The brake assembly of claim 12, wherein the inner case and the outer case form a coil recess that receive one or more electrical coils.

14. The brake assembly of claim 13, wherein two or more walls of the outer case extend around the one or more electrical coils and one or more walls of the inner case extend around the one or more electrical coils.

15. A method comprising:
a. creating an electromagnetic brake for a motor by:
  i. forming a core that includes a plurality of legs;
  ii. placing one or more electrical coils into the core;
  iii. placing a moving plate proximate to an electromagnet; and
  iv. placing a rotor adjacent to the moving plate;
b. deforming each of the plurality of legs during an assembly process.

16. The method of claim 15, wherein the method of forming the core includes a step of press fitting an inner case into an outer case.

17. The method of claim 5, wherein the electromagnetic brake includes a static plate and each of the plurality of legs are connected to the static plate by a rivet.

18. The method of claim 17, wherein the rotor and the moving plate are interposed between the static plate and the core.

19. The method of claim 18, wherein the moving plate is in contact with and guided by a plurality of rivets and a compression spring is extended over each of the plurality of rivets.

20. The method of claim 15, wherein the method includes a step of controlling an air gap by allowing each of the plurality of legs to elastically recover after each of the plurality of legs are deformed during the step of deforming.

* * * * *